United States Patent
Vetter

(10) Patent No.: US 9,109,924 B2
(45) Date of Patent: Aug. 18, 2015

(54) METHOD FOR DETERMINING THE SET POSITION OF AN ADJUSTMENT PART

(75) Inventor: Christian Vetter, Hirschaid (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 460 days.

(21) Appl. No.: 13/601,341

(22) Filed: Aug. 31, 2012

(65) Prior Publication Data

US 2012/0326706 A1   Dec. 27, 2012

Related U.S. Application Data

(63) Continuation of application No. PCT/EP2011/000230, filed on Jan. 20, 2011.

(30) Foreign Application Priority Data

Mar. 2, 2010   (DE) .......................... 10 2010 009 821

(51) Int. Cl.
*G01B 7/30* (2006.01)
*G01B 7/02* (2006.01)
*G01D 5/12* (2006.01)
*B60J 7/057* (2006.01)
(Continued)

(52) U.S. Cl.
CPC .............. *G01D 1/18* (2013.01); *E05F 15/695* (2015.01); *E05Y 2400/334* (2013.01); *E05Y 2400/342* (2013.01); *E05Y 2400/354* (2013.01); *E05Y 2400/452* (2013.01); *E05Y 2900/55* (2013.01)

(58) Field of Classification Search
CPC ........... E05F 15/00; E05F 15/40; E05F 15/60; E05F 15/603

USPC ......... 318/264–266, 272, 275, 277, 282, 286, 318/466–469
See application file for complete search history.

(56) References Cited

U.S. PATENT DOCUMENTS 5,483,135 A * 1/1996 Parks ............................ 318/469
5,689,160 A * 11/1997 Shigematsu et al. .......... 318/281
5,777,446 A 7/1998 Knab et al.
(Continued)

FOREIGN PATENT DOCUMENTS

CN   101241646 A   8/2008
CN   101506457 A   8/2009
(Continued)

OTHER PUBLICATIONS

Chinese Office Action for Chinese Application No. 201180002872.0 dated Dec. 10, 2013, English translation.

*Primary Examiner* — Bentsu Ro
(74) *Attorney, Agent, or Firm* — Muncy, Geissler, Olds & Lowe, P.C.

(57) ABSTRACT

An adjustment system and method is provided for determining a set position of a motor-driven adjustment part of a motor vehicle by a Hall sensor, which is arranged in a rotated magnetic field. The drive of the adjustment part is activated for a specified number of approaches of the adjustment part toward an end position. A counter is changed by a counting value upon each approach of the adjustment part toward the end position. A standardization drive to the end position is carried out when the specified number of approaches is reached, and each deactivation and/or activation of the Hall sensor is detected and the counter state of the counter is changed according to the number of deactivation and activation cycles.

11 Claims, 2 Drawing Sheets

(51) Int. Cl.
*G01D 1/18* (2006.01)
*E05F 15/695* (2015.01)

(56) References Cited

U.S. PATENT DOCUMENTS

| | | | | |
|---|---|---|---|---|
| 5,982,124 | A * | 11/1999 | Wang | 318/466 |
| 6,225,770 | B1 | 5/2001 | Heinrich et al. | |
| 6,346,787 | B1 | 2/2002 | Lamm et al. | |
| 6,545,439 | B2 * | 4/2003 | Kaeufl et al. | 318/280 |
| 8,297,682 | B2 | 10/2012 | Oirsouw et al. | |

FOREIGN PATENT DOCUMENTS

| | | |
|---|---|---|
| CN | 101549673 A | 10/2009 |
| DE | 195 27 456 A1 | 1/1997 |
| DE | 198 06 099 A1 | 11/1998 |
| DE | 198 38 293 A1 | 3/2000 |
| DE | 199 16 400 C1 | 5/2000 |
| DE | 10 2006 043 839 A1 | 3/2008 |
| EP | 0 290 106 A2 | 11/1988 |

* cited by examiner

METHOD FOR DETERMINING THE SET POSITION OF AN ADJUSTMENT PART

This nonprovisional application is a continuation of International Application No. PCT/EP2011/000230, which was filed on Jan. 20, 2011, and which claims priority to German Patent Application No. DE 10 2010 009 821.3, which was filed in Germany on Mar. 2, 2010, and which are both herein incorporated by reference.

BACKGROUND OF THE INVENTION

1. Field of the Invention

The invention relates to a method for determining the set position of a motor-driven adjustment part of a motor vehicle by means of a Hall sensor, which is arranged in a magnetic field rotated as a result of a motor rotation, whereby the drive of the adjustment part is activated for a specified number of approaches of the adjustment part toward an end position, whereby a counter is changed by a count value upon each approach of the adjustment part toward the end position, and whereby a standardization run to the end position is carried out when the specified number of approaches is reached. It refers further to an adjustment system operating according to this method.

2. Description of the Background Art

A plurality of adjustment devices or adjustment parts (adjustment elements), driven by electric motors, are typically present in a modern motor vehicle. These are, for example, an electric window lift or a sunroof. During a setting process of such an adjustment part a desired end position is to be reached precisely, to which end the set position of the adjustment element must be known accurately. Moreover, it is also often necessary to know the current set position or the parameters that can be derived therefrom, such as the setting speed or the traveled adjustment path, for the reliable detection of a case of pinching.

For example, DE 199 16 400 C1, which corresponds to U.S. Pat. No. 6,225,770, and which is incorporated herein by reference, discloses the provision of a position and rotation sensor for the most precise detection possible of the set position of a window pane. It includes two Hall sensors offset at a distance or angle from one another or a Hall sensor (Hall IC) having two Hall probes (sensitive surfaces) and a multipole, for example, two- or four-pole ring magnet, which is arranged on the drive shaft of the electric motor. The Hall sensor detects a change in the magnetic field due to a rotation of the ring magnet, fixedly connected to the drive shaft, and generates counting pulses therefrom. These are evaluated together with information on the rotation direction of the ring magnet and thereby of the electric motor, by counting the counting pulses upward or downward depending on the rotation direction of the drive and thus indicating the respective position of the window pane.

DE 10 2006 043 839 A1 discloses a conversion of magnetic field changes, occurring at Hall probes or Hall sensors, of a comparator circuit with hysteresis (Schmitt trigger circuit) into two binary pulse trains, offset, for example, by 90° to one another. An upper switching threshold and a lower switching threshold are provided in such a comparator circuit with hysteresis. The motor or drive speed and thereby the position of the adjustment part and the rotation direction of the electric motor or rotary drive can be determined by counting the pulses per unit time by a comparison of the two pulse trains.

In adjustment systems with two end positions (open and closed), such as particularly in the case of a window lift drive, first as part of a first learning or standardization cycle, at least one of the end positions is directly approached and in this position the count value of a counter is set to a specific value, particularly to zero. During the movement toward the other end position due to an activation of the drive or electric motor in the opposite direction, the Hall sensor generates a number of counting pulses, which, for example, increment a position counter, whereby when the other end position is reached the current counter state is assigned to this end position and, for example, is stored. Thereby, each position of the driven adjustment part along the adjustment path between the two end positions is assigned a count value of the position counter. During the subsequent movements toward this end position, particularly the closed position (approach cycles), the drive is stopped shortly before reaching the standardized count value during normal operation in order to perform so-called soft starts of the adjustment element in the end stop, also designated as a capture region or seal entry, to increase the lifetime solely due to the inertia of the system.

To take into account changes in the adjustment system that occur during proper use, e.g., the end position, and to post-adjust the adjustment system, DE 195 27 456 B4, which corresponds to U.S. Pat. No. 5,777,446, discloses the movement toward the end position in a standardization run without a soft start after a specified number of approach cycles and the resetting of the counter for the purpose of standardization to a specific value, for example, again to zero. In this way, a fixed number of approaches is specified after which a standardization run occurs in each case.

DE 198 38 293 A1, which corresponds to U.S. Pat. No. 6,346,787, discloses, moreover, instead of a fixedly specified number of approach cycles, to design the number of cycles as variable and to this end after each standardization run to generate a random number for the subsequent approach cycles, after which the next standardization run is to occur. The wear of the system is said to be reduced and the lifetime increased by generating the random number, which is decremented with each approach cycle of the adjustment part, to be positioned, up to the specified count value, which triggers a standardization run.

SUMMARY OF THE INVENTION

It is therefore an object of the invention to provide a method, as optimized as possible with respect to the positional accuracy and lifetime of the adjustment part, to determine the set position of a motor-driven adjustment part of a motor vehicle. Further, an adjustment system especially suitable for this purpose is to be provided.

In an embodiment, a counter is changed by a count value, particularly decremented, upon each approach of the adjustment part toward an end position, particularly toward the closing position. If an approach or standardization value determining the specified number of approaches of the adjustment part toward the end position is reached, a standardization run is performed by controlling the adjustment part to the end position without the drive being shut off beforehand. Next, the counter is reset to the or a different specified start or standardization value (initial value). In so doing, the change in the counter occurs in addition according to the number of deactivation or activation cycles of the Hall sensor, to which end each deactivation or activation of the Hall sensor is detected and changes the counter in each case by a count value.

In an embodiment, the number of required standardization runs can be optimized, when these are adapted individually and automatically in the most reliable and thereby resource-saving manner possible to the operational or user-specific conditions of the adjustment system. The specific conditions can be represented in this case by information present in the adjustment system or already contained in the electronics assigned to it. Especially suitable for this is the user-specific different number of deactivations and activations of the Hall sensor, i.e., the number the so-called "sleep and wake-up cycles" after the turning on and off of the vehicle or the control electronics of the adjustment system and thereby the power supply of the Hall sensor.

The invention is thereby based on the realization that states may occur that lead to a miscount during use of a Hall sensor, in which a change in level occurs with the exceeding of the upper switching threshold and falling below the lower switching threshold and a specific level within the hysteresis, for example, a high level, is specified. There is a risk of an immediate miscounting of the Hall sensor particularly after the turning off of the Hall sensor (sleep) and turning on again of the Hall sensor (wake up), when due to temperature or operation the switching thresholds are shifted and as a result a pulse is overcounted or undercounted.

Further, as has been realized, the miscount probability for the Hall sensor or for the position counter counting the sensor pulses and thereby a positional inaccuracy of the adjustment part is the greater the more often such wake-up and sleep cycles occur. By means of the detection of the number of these cycles (deactivation or activation cycles), therefore system-inherent information is available for the frequency of standardization runs to be performed. Here, standardization runs should be performed the more often, the more often such deactivation or activation cycles of the Hall sensor occur. Likewise, the number of standardization runs, for example, compared with a specified number of necessary standardization runs, can be reduced vehicle-specific with an only relatively low number of such Hall sensor deactivation cycles; this reduces the wear of the adjustment system and increases its lifetime.

The counter for the approach or standardization cycles can be changed by a count value, when a minimum value of the counter is exceeded in a Hall sensor deactivation cycle. If necessary, the counter can be suitably reduced by the count value. Otherwise, the counter is not reduced but preferably a query is made whether it has reached the set or specified counter state (initial count value). Preferably, the query asks whether the counter is precisely zero. Optionally, a standardization run is performed, whereas otherwise a new deactivation and activation event of the Hall sensor is detected and queried. Parallel to the change in the count value according to the number of Hall sensor activation cycles, the counter is changed by a count value, specifically reduced, when an approach by the adjustment part toward or entering into the end position is detected.

If a standardization run was performed, then the counter is set to the start value or initial value or to a parameterizable new maximum value, in order to then detect and to count again the activation or deactivation cycles of the Hall sensor and the approach cycles of the adjustment part toward or to the end position.

In an embodiment, the adjustment system comprises a Hall sensor, which is exposed to a magnetic field rotated as a result of a motor rotation, particularly a ring magnet fixed to the motor shaft. A control unit, expediently having a microprocessor or in the form of a microprocessor, controls the Hall sensor for its deactivation and reactivation. Moreover, the control unit controls the drive of the adjustment part for a number of approaches of the adjustment part toward the end position and, if necessary, initiates a standardization run to the end position. A counter changes in each case by a count value with each approach of the adjustment part toward the end position and as a function of the number of activation and deactivation cycles. In this case, the control unit detects each deactivation and subsequent activation of the Hall sensor.

The control unit controls the drive of the adjustment part depending on the count pulses, generated by the Hall sensor, to move the adjustment part along an adjustment path between two end positions. The control unit to this end has a position counter, which evaluates the sensor pulses of the Hall sensor and changes the counter to determine the standardization runs by a count value, when the adjustment part is in the end position. The activation or deactivation of the Hall sensor in this case occurs preferably depending on the status of a state signal, representing the operational state of the motor vehicle, for example, depending on the turning on or off of the vehicle ignition and thereby the power supply of the control unit (control electronics), which in turn controls the Hall sensor, for example, via a driver with a constant voltage circuitry.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
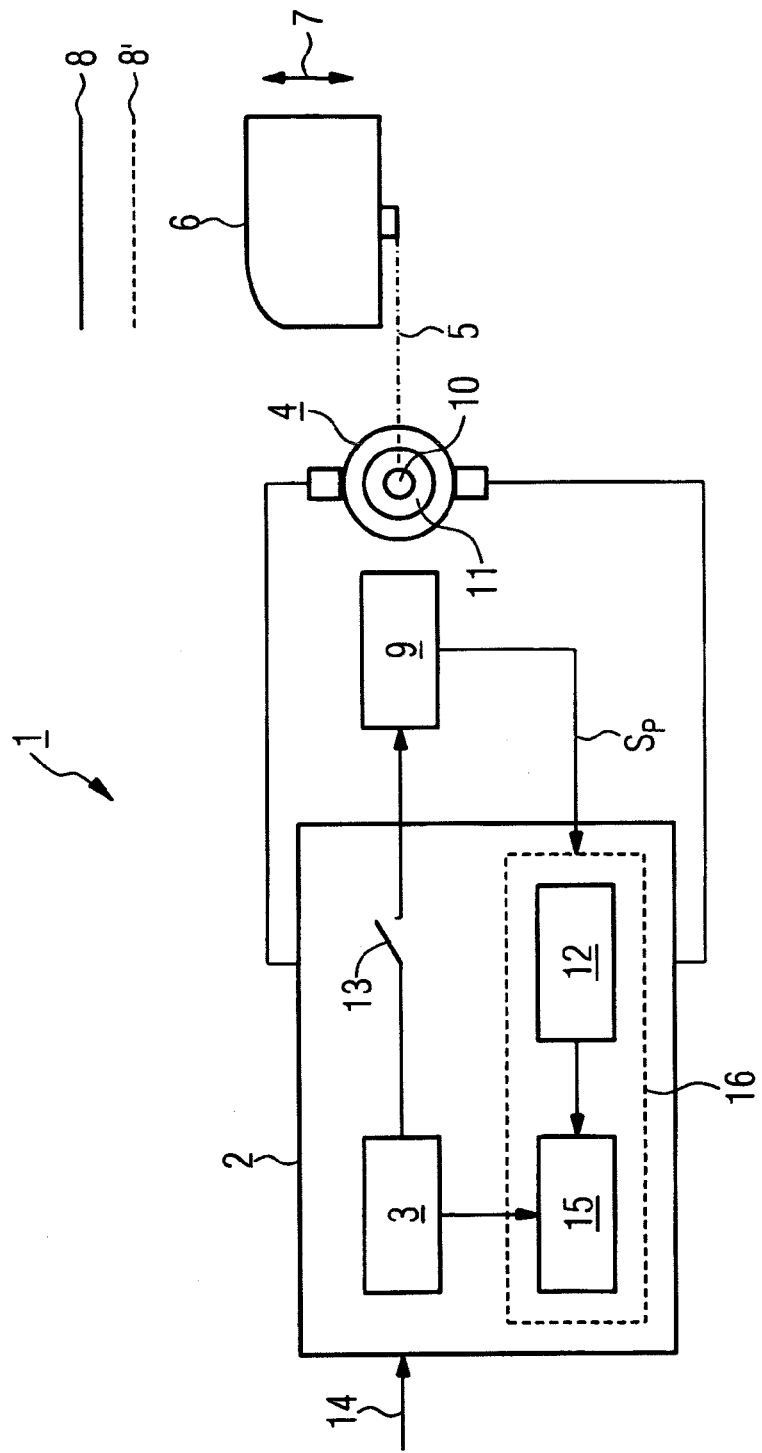
FIG. 1 shows schematically an adjustment system for a motor-driven adjustment part to carry out the method.

FIG. 1 shows schematically an adjustment system 1, also called a drive system, particularly of a window lift or window lift drive of a motor vehicle. Adjustment system 1 comprises a control unit 2 having a microprocessor 3 for a reversible electric motor 4, which is coupled via drive 5, indicated by a dot-dash line, to an adjustment part 6 to be positioned, here a vehicle window. Adjustment part 6 to be positioned is moved by electric motor 4 in two directions according to the double arrow showing the adjustment direction 7 up to the end stops in the end positions, for which only the closed position 8 is indicated. At a small distance before end position 8 there is a stop position 8', at which adjustment part 6 is stopped by control unit 2. Stop position 8' is selected here in such a way that adjustment part 6, reaching said position 8', is stopped in fact actively by electric motor 4, but due to the inertia of the system moves gently virtually without power into end position 8.

Electric motor 4 is assigned a magnetic field-sensitive position sensor 9, which is exposed to the magnetic field, changing due to motor rotation, of ring magnet 11, arranged fixedly on the shaft, on motor shaft 10. Position sensor 9 generates a pulse-shaped sensor signal $S_P$, whose pulse train is supplied to control unit 2 to evaluate the position, movement direction, and/or the speed of adjustment part 6. A position counter 12 of control unit 2 thereby counts the sensor pulses of the signal $S_P$ of position sensor 9 upward or downward according to the direction of motion of adjustment part 6. Each count value of position counter 12 is thus assigned a specific position of adjustment part 6 along its adjustment path between the (not shown) end position (open position) and end position 8 (closed position).

A Hall sensor with two spaced-apart Hall probes in the form of two sensitive surfaces is preferably provided as position sensor 9; to form a sensor-internal evaluation electronics, for example, in ASIC technology (application specific integrated circuit), these are integrated in addition in a semiconductor chip (Hall IC) (German Offenlegungsschrift No. DE 101 54 498 B4). In the presence of the magnetic field of ring magnet 11 perpendicular to the sensitive surfaces of sensor 9, a Hall voltage can be measured, which is proportional to the magnetic flux density (induction). Based on this proportionality between the Hall voltage and the magnetic flux density, a change in the magnetic flux density (magnetic field change) is detected by means of sensor 9, so that the Hall voltage change, proportional to this, can be evaluated as sensor signal $S_P$.

Depending on the distance of ring magnet 11 to the Hall surfaces of sensor 9, an at least approximately sinusoidal curve as a function of the angle of rotation is obtained for the Hall voltage. If the relevant field component of the sinusoidal flux density (Hall voltage) as a function of the angle of rotation exceeds an upper switching threshold, the pulse within the pulse train changes from a first logic level to a second logic level. This state is maintained until the relevant field component of the flux density or the Hall voltage falls below a lower switching threshold.

Thus, the pulse train of sensor signal Sp, for example, both below the lower threshold and within the hysteresis between the two switching thresholds, contains the high level (logic 1) until the upper switching threshold is again exceeded. Therefore, the low level (logic 0) is retained within the hysteresis in the pulse train of the sensor signal $S_P$, until the value again falls below the lower switching threshold. The upper switching threshold and the lower switching threshold are arranged symmetrically around the middle line of the hysteresis, representing the zero crossing of the approximately sinusoidal course of the magnetic flux density or Hall voltage. The state definition, for which a low level is always specified above the upper switching threshold and a high level is specified below it, is typical in a CMOS Hall sensor.

Position or Hall sensor 9 is controlled by control unit 2 or its microprocessor 3, i.e., particularly turned on and off and thus activated or deactivated. This is symbolized by the shown switch 13. This activation or deactivation of sensor 9 occurs as a function of the operational state of the motor vehicle. If, for example, the ignition of the motor vehicle is turned off, thus control unit 2 or microprocessor 3 detects this from the state of an input signal 14, for example, at a corresponding connecting terminal (terminal 15) of employed control unit 2. The operational state of the vehicle can also be supplied to control unit 2 via a vehicle-internal bus system as input signal 14.

The deactivation of the vehicle via, control unit 2 leads to the deactivation (sleep) of sensor 9. The activation (wake up) of sensor 9 occurs similarly with the reactivation of the vehicle via control unit 2. These sleep and wake-up cycles and therefore the number of deactivations and subsequent activations of sensor 9 initiate a counter 15 to change, particularly to decrement, its parameterized starting value, therefore a specified initial count value, by a count value. If counter 15 has reached a specific, again parameterizable end count value, for example, the counter state of zero, thus during the next actuation of adjustment system 1, i.e., in the exemplary embodiment of the window lift, a standardization run occurs automatically during which electric motor 4, controlled by control unit 2, is not stopped or turned off at stop position 8'. Rather, during this standardization run, adjustment part 6 is moved without a motor stop to end position 8 and then position counter 12 is set to its start value, for example, to the count value zero. Hereby, position counter 12 is standardized in that its current count value (counter state) is now again synchronized with the actual end position 8 of adjustment part 6. In this way, possible miscount errors are compensated or corrected, which occur during the prior approaches of adjustment part 6 to stop position 8' or beyond this to end position 8 as a result of temperature- or operation-induced variations in the hysteresis switching thresholds of sensor 9.

The initial or standardization value of counter 15 is reduced by a count value, moreover, with each approach of adjustment part 6 toward end position 8. Because of this, the frequency of the approach cycles of adjustment part 6 toward or to end position 8 is taken into account, so that miscount errors, which occur as a result of the approach cycles and may accumulate as a function of the number of approach cycles, can be compensated by the more or less frequent standardization runs accordingly depending on this number of approaches, whereby the particular counter state of position counter 12 is corrected. In so doing, counters 12 and 15 can be separated from one another or can be a single counter 16.

Figure 2:
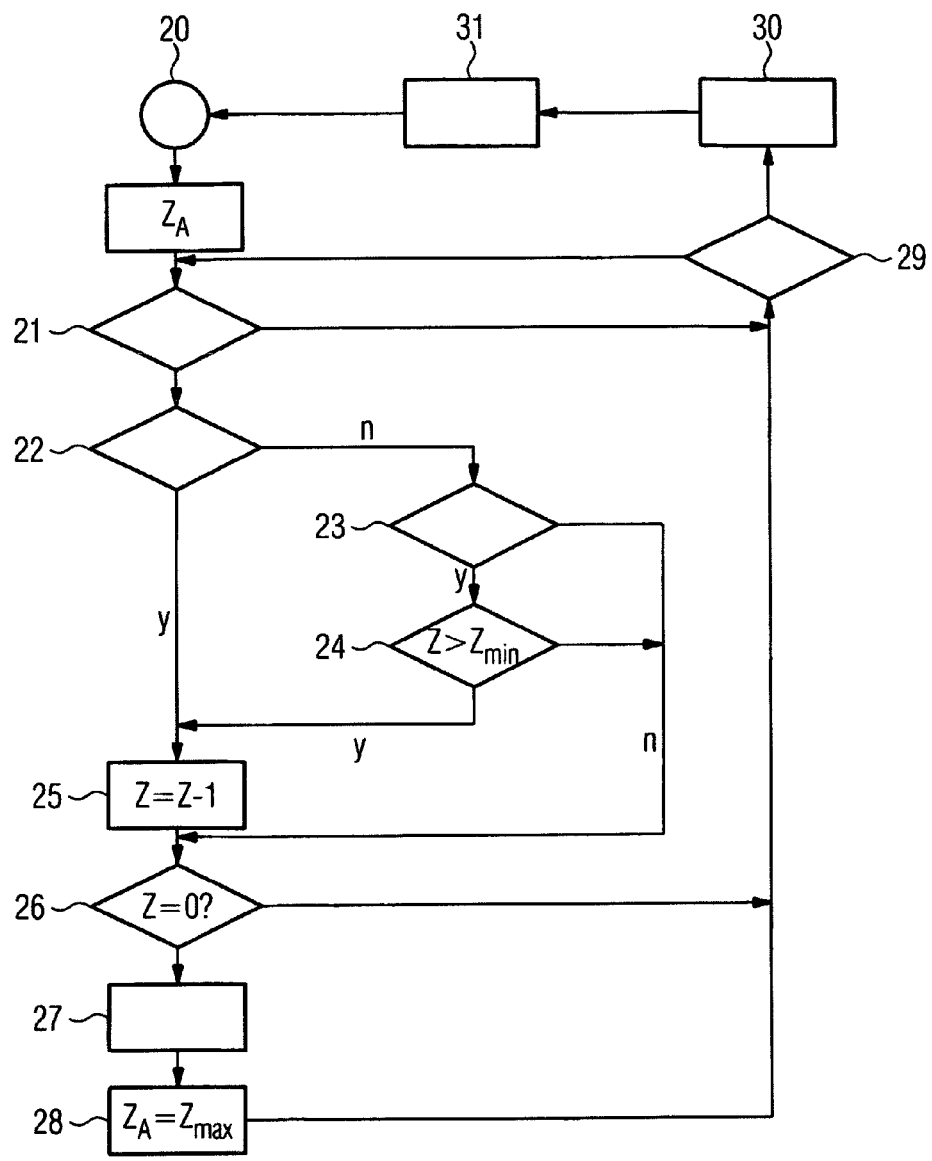
FIG. 2 shows a flowchart of the method of the invention.

The course of the algorithm stored in control unit 2 or in microprocessor 3, according to which the method of the invention is carried out, is illustrated in FIG. 2 in the form of a flowchart (flow diagram). The shown flowchart illustrates substantially the procedure for initiating a standardization run as a function of the detected number of deactivation and activation cycles of sensor 9.

If an activation (wake up) of sensor 9 occurs in substep 20, thus first counter 15 is loaded, i.e., set with its parameterized initial value $Z_A$. The initial value in this case can represent or specify, for example, fifty (50) start cycles of adjustment part 6 to end position 8. If an activation of adjustment part 6 occurs in the next substep 21, thus the query is made in the following substep 22 whether this is a case of an approach cycle with the movement of adjustment part 6 to end position 8. Optionally, the counter, i.e., its initial count value Z, is decremented by a count value to the value Z−1. If no moving to end position 8 occurs, thus the query is made in substep 23 whether an activation (wake up) of sensor 9 has occurred previously. Optionally, reduction of the count value Z of counter 15 by a count value occurs in substep 25.

Alternatively, it can be queried beforehand in a substep 24 whether the count value Z of counter 15 exceeds a previously parameterized minimal count value $Z_{min}$. The respective condition $Z > Z_{min}$ must be met by this substep 24, so that counter 15 is reduced by a count value in substep 24. Otherwise, i.e., if the counter has reached the minimum value $Z_{min}$, the query is made directly in substep 26 whether the counter or the count value Z is precisely equal to zero. Otherwise, this query is made in substep 26, after the counter had been reduced by a count value beforehand in substep 25.

If the count value or counter state Z=0 is reached, then a standardization run is initiated in substep 27 and counter 15 is then reset in substep 28. In this case, counter 15 is set to the original initial value $Z_A$ or to a parameterizable maximum value $Z_A = Z_{max}$.

If the query in substep 26 indicates that counter 15 is not equal to zero, then in substep 29 the query is made whether a deactivation (sleep) of sensor 9 has been requested or has occurred. Optionally, the current counter state of counter 15 is stored and the occurrence of deactivation (sleep) in substep 31 is recorded. An activation (wake up) of sensor 9, initiated subsequent to the deactivation (sleep), again leads to substep 20, with which the process runs again and begins with the loading or setting of counter 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a set position of a motor-driven adjustment part of a motor vehicle, the method comprising:
    arranging a Hall sensor in a rotated magnetic field, a drive of the adjustment part being activated for a specified number of approaches of the adjustment part toward an end position;
    changing a counter by a count value upon each approach of the adjustment part toward the end position;
    performing a standardization run to the end position when the specified number of approaches is reached;
    detecting each deactivation and/or activation of the Hall sensor; and
    changing the counter state of the counter according to the number of deactivation and activation cycles.

2. The method according to claim 1, wherein the counter is changed by a count value when a minimum value of the counter is exceeded in a deactivation and activation cycle.

3. The method according to claim 1, wherein the counter is decremented by a count value with each deactivation and activation cycle.

4. The method according to claim 1, wherein the Hall sensor is activated or deactivated depending on the operational state of the motor vehicle.

5. The method according to claim 1, wherein the standardization run is initiated when a counter end state is reached.

6. The method according to claim 1, wherein, subsequent to a standardization run, the counter is set to a maximum value.

7. An adjustment system for a motor-driven adjustment part of a motor vehicle, the adjustment system comprising:
    a Hall sensor that is exposed to a magnetic field rotated as a result of a motor rotation;
    a control unit configured to control the Hall sensor for its deactivation and reactivation and configured to control a drive of the adjustment part for a number of approaches of the adjustment part toward an end position and then for a standardization run to the end position; and
    a counter, which is adapted to change by a count value upon each approach of the adjustment part toward the end position,
    wherein the control unit detects each deactivation and subsequent activation of the Hall sensor, and
    wherein the counter changes the counter state according to the number of activation and deactivation cycles.

8. The adjustment system according to claim 7, wherein the control unit controls the drive of the adjustment part depending on the count pulses generated by the Hall sensor, to move the adjustment part along an adjustment path between two end positions.

9. The adjustment system according to claim 7, wherein the control unit has a position counter, which evaluates the sensor pulses of the Hall sensor and changes the counter by a count value, when the adjustment part is in the end position.

10. The adjustment system according to claim 7, wherein the control unit activates or deactivates the Hall sensor based on a status of a state signal representing the operational state of the motor vehicle.

11. The adjustment system according to claim 7, wherein the magnetic field is generated via a ring magnet fixed to the motor shaft.

* * * * *